United States Patent [19]

Seymour et al.

[11] Patent Number: 5,434,788
[45] Date of Patent: Jul. 18, 1995

[54] SENSORY SYSTEM FOR VEHICLE NAVIGATION

[75] Inventors: Leslie G. Seymour, Barrington; Michael Barnea, Highland Park; Clyde B. Harris, Palatine; Allan M. Kirson, Highland Park, all of Ill.

[73] Assignee: Motorola, Inc., Schaumburg, Ill.

[21] Appl. No.: 260,507

[22] Filed: Jun. 15, 1994

Related U.S. Application Data

[63] Continuation of Ser. No. 786,500, Nov. 1, 1991, abandoned.

[51] Int. Cl.$^6$ .......................................... G06F 165/00
[52] U.S. Cl. .................................. 364/449; 364/450; 395/905
[58] Field of Search ............... 364/424.01, 424.02, 364/449, 452, 450; 395/900, 913, 905; 342/357, 457

[56] References Cited

U.S. PATENT DOCUMENTS

| | | | |
|---|---|---|---|
| 4,024,382 | 5/1978 | Fowler | 364/449 |
| 4,796,191 | 1/1989 | Honey et al. | 364/450 |
| 4,882,696 | 11/1989 | Nimura et al. | 364/449 |
| 4,899,285 | 2/1990 | Nakayama et al. | 364/453 |
| 4,937,752 | 6/1990 | Nanba et al. | 364/449 |
| 5,046,011 | 9/1991 | Kakihara et al. | 364/450 |
| 5,122,957 | 6/1992 | Hattori | 364/424.02 |

FOREIGN PATENT DOCUMENTS 2009171 2/1990 Canada.

OTHER PUBLICATIONS

"Neural Network And Fuzzy Systems—A Dynamical Systems Approach To Machine Intelligence", Bart Kosko; Prentice Hall 1992; Englewood Cliffs, NJ; pp. 13, 18, 19.
"Fuzzy Logic Simplifies Complex Control Problems", Tom Williams, Computer Design, Mar. 1, 1991.
Fusion of Multisensor Data, John M. Richardson, Kenneth A. Marsh; International Journal of Robotics Research; vol. 7, no. 6; Dec. 1988; pp. 78–87.
Knowledge Representation in Fuzzy Logic, Lotfi A. Zadeh, IEEE Transactions on Knowledge and Data Engineering, vol. 1, No. 1, Mar. 1989.
"Reasoning For Interpreting Sensor Data," P. J. Braspenning, International Conference Intelligent Autonomous Vehicles, Amsterdam, 1986.
"Sensor Failure Detection Using a Hybrid Analytical-/Intelligent Algorithm," George Vachstevanos, International Conference Intelligent Autonomous Vehicles, Amsterdam, 1986.
Fuzzy Systems and Applications, United Signals and Systems, Inc., Bart Kosko with Fred Watkins, Jun. 5–7, 1991.
Integration of GPS and Dead Reckoning Navigation Systems, Wei-Wen Kao, VNIS '91 conference from Oct. 20–23, Dearborn, Mich.
Database Accuracy Effects on Vehicle Positioning as Measured by the Certainty Factor, R. Borcherts, C. Collier, E. Koch, R. Bennet, VNIS '91 conference from Oct. 20–23, Dearborn, Mich.
Data Fusion in Pathfinder and Travtek, Roy Sumner, VNIS '91 conference, Oct. 20–23, Dearborn, Mich.

*Primary Examiner*—Michael Zanelli
*Attorney, Agent, or Firm*—Nicholas C. Hopman

[57] ABSTRACT

An improved accuracy sensory system for vehicle navigation employs a sensor, such as a compass (515), or an odometer (509), for sensing a navigation parameter of a vehicle. A signal is provided from the sensor, having an erroneous component. A model free recognizer, such as a fuzzy inferencing navigation computer (501), is employed to recognize this erroneous behavior. After recognition, the sensor can be recalibrated, or assigned a clearness coefficient. The signal is then combined with other measurements of the same parameter and subjected to map matching before deriving the final navigation variable.

5 Claims, 6 Drawing Sheets

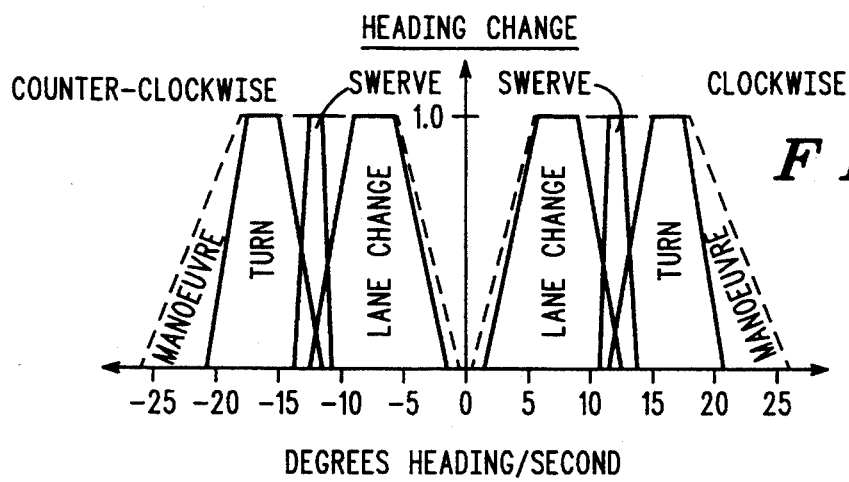
FIG.16
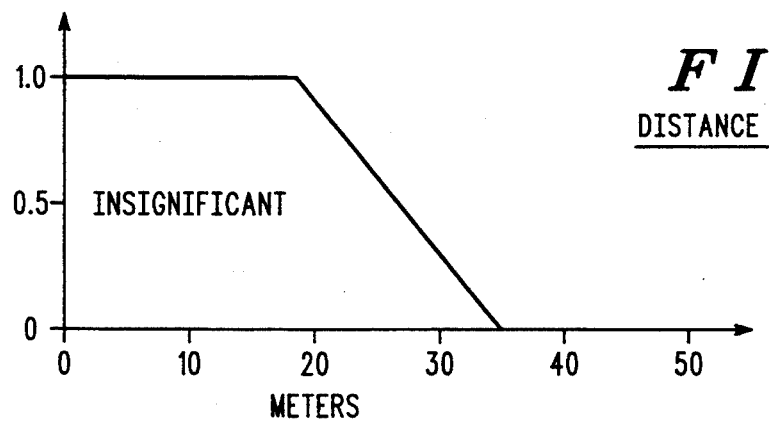
FIG.17
DISTANCE ERROR
FIG.18
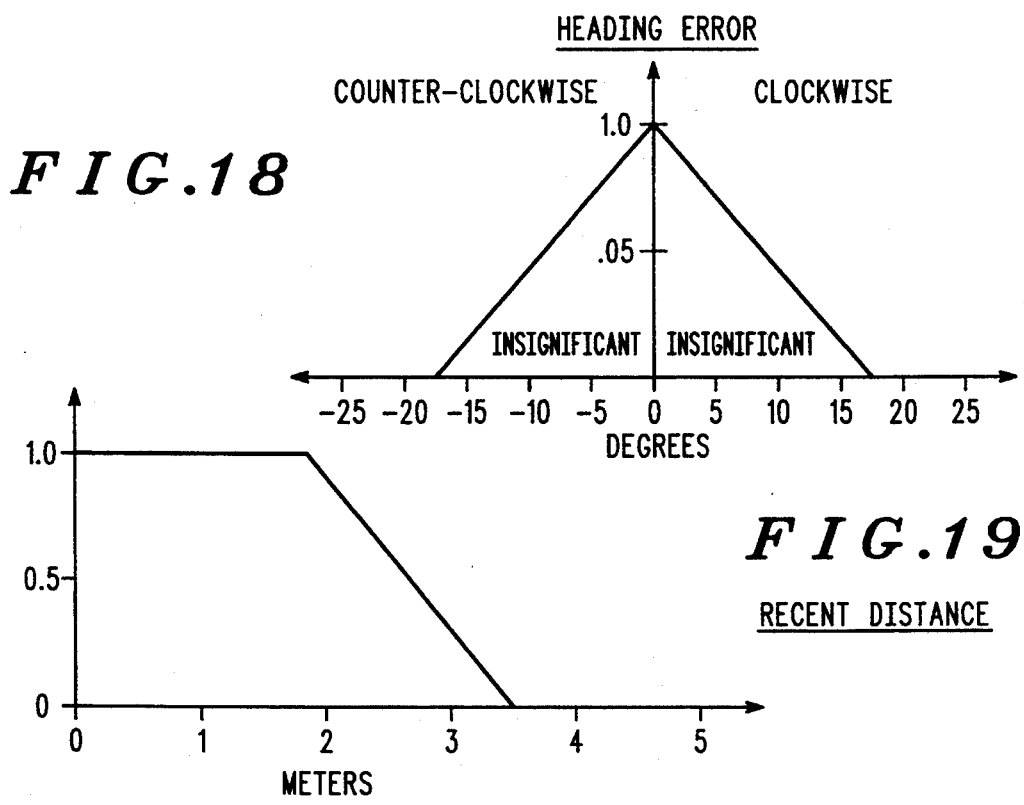
FIG.19
RECENT DISTANCE

SENSORY SYSTEM FOR VEHICLE NAVIGATION

This is a continuation of U.S. application Ser. No. 07/786,500, filed Nov. 1, 1991 and now abandoned.

FIELD OF THE INVENTION

This invention is directed generally to the field of navigation, and more particularly to a system for improving the accuracy of the system. The present invention is related to U.S. patent application No. 07/786,867 A VEHICLE ROUTE PLANNING SYSTEM, Seymour et. al. and to U.S. patent application No. 07/786,450 A VEHICLE ROUTE GUIDANCE SYSTEM, Seymour et. al., both of which were filed on the same date herewith and are assigned to the assignee of the present invention.

BACKGROUND OF THE INVENTION

Modern vehicle navigation systems use several different types of sensors to measure the same or related information for navigation purposes. Examples of such types of sensors are the differential odometer, compass, altimeter, steering angle sensor, gyroscope, differential accelerometer, GPS receiver, and CD ROM, or semiconductor memory based digital map database, to consider a few. Vehicular navigation by dead-reckoning, or odometry, relying on a differential odometer is commonplace. We will first look at the differential odometer to exemplify the problem with current technology.

A differential odometer is typically constructed with a pair of pulse counting sensors each of which are mounted on laterally opposite sides of the vehicle to the non-powered wheels. As the vehicle moves and the wheels rotate, pulses are generated, the incremental number indicating distance traversed. The difference in pulses generated between the pair of sensors is indicative of the change in heading. While navigating by dead-reckoning, the vehicle will develop a location uncertainty that increases during operation due to various error sources inherent in the behavior of an incremental positioning system. These error sources include systematic errors, gross errors, and random errors. If uncorrected these errors are substantial and make the navigation system impractical. We now look at some error sources in more detail.

Errors are systematic in nature when they are consistently repeatable and expected by the nature of the sensor in response to installation and/or vehicle dynamics. In the case of the differential odometer, as the vehicle travels, or traverses, an unknown variation in tire circumference will yield a difference in the rate output from the pair of sensors. This difference, or change in heading, manifests itself in a sensed circular pattern, indicating to the observer that the vehicle is turning when it isn't. The error contributable to this circular behavior can be significant. Experience shows cases of differences in position caused by cumulative heading errors of 200 meters per kilometer.

Another example of a systematic error can be illustrated when a differential odometer is applied to the non-powered front, or steered wheels, of a rear wheel drive vehicle. In this case the differential odometer suffers from tracking error when the vehicle turns, as the distance between the tires is changing, yielding heading errors. Other tire circumference variations, resulting from wear, centrifugal forces resulting from speed variation, and pressure variations resulting from temperature effects, all contribute to systematically erroneous behavior.

Other sources of systematic error include terrain aberrations, or altitude changes resulting from hills causing distance traversed errors when compared to a map, and ground surface to mapping plane transformation errors, resulting from the curvature of the earth. Of course other sensors characteristically have systematic errors. In a compass they include: axis offset installation, compass plane not being parallel to the source magnetic field, for instance when driving on a slope, and vehicle internal magnetic anomalies. An added compass error is found when one considers the declination angle between geographic north and magnetic north. At compass installation this can be inherently corrected by proper installation, however when traversing, this declination angle dynamically changes resulting from the curvature of the earth. Systematic errors characteristic of a GPS receiver include: inaccuracy resulting from satellite ephemeris, and partial availability of satellites. For GPS receivers, systematic errors include inaccurate modeling of the atmospheric effects. Digital maps exhibit systematic error with partial availability and precision of position coordinates. Generalized systematic errors from a sensory system include sensor synchronization problems, resulting from the asynchronous availability of information from distinct sensory devices. For instance, in a GPS sensor the available position information is updated asynchronously and relatively infrequently compared to the differential odometer, requiring interpolation of absolute location systematically adding error.

Gross errors are characteristic of the sensory interaction with the vehicle's behavior, and are typically transient or noncontinuous in nature. Differential odometer examples include wheel slippage including lateral slip, resulting from surface potholes, or differing surface friction coefficients such as one wheel on ice and the other on firm ground, or skidding on a turn maneuver. Gross errors in a compass include magnetic blunders, resulting from a temporary interfering magnetic field, such as expected when traversing a metal bridge with a magnetic bias. Gross errors in a GPS receiver include multi-path reflections from buildings increasing pseudoranges.

Random errors are more likely to average to zero over time. Because of the nature of random errors correlation between adjacent sensor readings cannot be reliably established. Sensor readings can result in any value. The time of occurrence and discontinuation of a random error is unpredictable. An example of random error in a differential odometer is the missing of pulses, resulting from a variety of reasons including electromagnetic interference or loose electrical connections. A random compass error occurs when it gets disturbed from its mount by driving on a rough road. GPS receiver random errors are inherent in the pseudo-range measurement.

This list is not meant to be exhaustive or exclusive but represents the many error sources that a vehicle navigation system needs to consider when deriving accurate vehicle location, position and heading variables.

Reference art teaches correction of location errors by a variety of map matching schemes. These include correction after turning from one road segment to the next, and probabilistic solutions. The latter are accomplished by assigning a probability to adjacent map segments based on their relationship to the sensed motion of the vehicle, then selecting the most probable segment based on these probability assignments. Although this technique may work in a crude manner, it fails miserably when the operator transits off the map or to a new road segment contained within the map domain but not identified. Others have tried to recognize and correct for certain error types with an analytical approach. These techniques are characteristically computation intensive, requiring a high level of resource to operate. These attempts don't address many error sources, and only addresses a small set of problems infrequently.

In summary, vehicular navigation relies on various navigation parameters provided by sensors and map information to derive current location, position, and heading variables. This information is known to have erroneous behavior and is not continuously available. This yields a certain uncertainty in the vehicle location, position, and heading variables. Analytical, or crisp, models have failed to provide a good fit to describe the nature of all erroneous behavior. Hence, excessively high precision and generous error windows are applied to assure vehicle location, position, and heading information taxing computational and memory resources. These analytical models also have a low tolerance to unforeseen exception conditions that may severely degrade system performance and product quality.

SUMMARY OF THE INVENTION

An improved accuracy sensory system for vehicle navigation includes a sensor for sensing a navigation parameter of a vehicle and providing a signal having a related behavior. Further, a model free recognizer is used to recognize the behavior.

BRIEF DESCRIPTION OF THE DRAWINGS

The present invention will be effectively comprehended when read with the aid of the accompanying drawings in which:

FIG. 16 is a fuzzy set described in a preferred embodiment for quantifying maneuvers.

FIG. 17 is a fuzzy set described in a preferred embodiment for quantifying dead-reckoned distance error as Insignificant.

FIG. 18 is a fuzzy set described in a preferred embodiment for quantifying dead-reckoned heading error as Insignificant.

FIG. 19 is a fuzzy set described in a preferred embodiment for quantifying the Recent distance significance.

DETAILED DESCRIPTION OF THE PREFERRED EMBODIMENT

Figure 1:
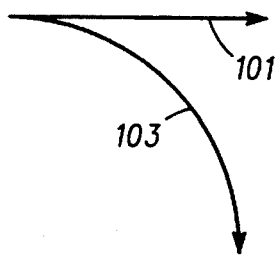
FIG. 1 is a diagram of heading information output over time from a compass and the circular error, systematic in nature, in heading information output from a differential odometer.

In a preferred embodiment we disclose a system for improving the accuracy of the information sensed by an on-vehicle navigation system. This system has sensors developing signals representative of the behavior of various navigation parameters, and a model free means, in this case a fuzzy inferencing method, for recognizing a behavior present in the signal. Of course, it would be obvious to one with ordinary skill in the art to substitute another model free means for recognition such as a neural network, genetic learning method, or other model derivable from observations directly rather than by analytical methods. A model free means, as it applies here, is a technique for estimating input-output functions, or stimulus-response associations based on a non-analytic means.

The preferred embodiment applies fuzzy inferencing, based on fuzzy sets, as described by Lotfi Zadah in his landmark treatise "Fuzzy Sets", published in Information and Control, Vol. 8, pages 338–353, by the Academic Press, 1965.

Kosko's treatise on NEURAL NETWORKS AND FUZZY SYSTEMS—A DYNAMICAL SYSTEMS APPROACH TO MACHINE INTELLIGENCE, published by PRENTICE HALL, Englewood Cliffs, N.J. 07632, 1992, teaches the subject of fuzzy function estimation. Kosko teaches that any function can be approximated by a set of fuzzy patches, defined as fuzzy rules with fuzzy sets. In turn, any pattern discernable by a human expert can be approximated by these fuzzy patches. Further, in the seminar titled FUZZY SYSTEMS AND APPLICATIONS, from Jun. 5th to Jun.

7th 1991, Bart Kosko described fuzzy patches. One can derive an understanding of a fuzzy patch from these references. Further, by designing the patches, built by expert knowledge, we can recognize a behavior, or function, in the continuous data. As the functions of continuous behavior of the data gets more complex we must combine patches to seek recognition of these complex behaviors.

In a vehicular navigation system different sources of errors lead to different patterns of deviation from the expected behavior. By knowing what error sources lead to what pattern of deviation we detect or recognize the erroneous behavior. Of course, behavior recognition, other than erroneous is also useful as we will discuss later with the recognition of maneuvers. We apply the former construct of fuzzy patches to recognize various behavior of sensory devices, in some cases modify the sensory signal, assign the sensor a clearness coefficient, and/or recalibrate the sensory device to provide more accurate information about a navigation variable, such as vehicle heading to a navigation computer.

In a preferred embodiment we illustrate a solution to the problems outlined earlier. We do this by breaking down the problems associated with sensor inaccuracies into smaller component problems, illustrating various error types from sensors. After recognizing various behavior and in some cases correcting this behavior by recalibration of the sensor, we fuse the navigation parameters, and apply map matching to further improve the accuracy of sensory information available as navigation variables for vehicle navigation. We will concentrate on the heading variable in our examples. Of course, it would be obvious to one of ordinary skill in the art to apply this solution to other navigation variables including position and location.

The first problem, and solution, we illustrate is the effect on the heading variable resulting from a certain tire circumference difference sensed by the differential odometer. This is an example of a systematic error. To illustrate an error gross in nature affecting the heading variable we will illustrate two cases. The first is the effect of wheel slippage on the differential odometer sensor and the second the effect of a magnetic blunder on the compass sensor and the assignment of clearness coefficients, or values, to these sensors. We then combine, or fuse, data from various sensors taking into account their clearness values. We also use map matching to derive the heading variable used in the navigation system for dead-reckoning, or other navigation scheme. Of course, this technique is applicable to other navigation parameters benefiting the accuracy of other navigation variables such as position. Throughout these examples we apply the same process of fuzzy recognition and in some cases modification, recalibration, or assignment of clearness coefficients.

As noted earlier, one observed behavior can reflect a systematically erroneous heading and distance value caused by a certain difference in the tire circumference of the left and right wheels equipped with the differential odometer sensors. As shown in FIG. 1, when comparing the differential odometer heading readings 103 with the corresponding compass heading readings 101, a circular behavior emerges. The recognition of this behavior is intuitively obvious. As the behavior takes on an approximate shape, instead of an exact shape we employ a fuzzy inferencing method that enables us to efficiently recognize and modify this behavior by recalibrating the differential odometer. We further apply a GPS receiver, so that while recalibrating the differential odometer for a heading error we do not introduce an additional error in the distance parameter indicated by the differential odometer.

Other sensory devices such as an altimeter, steering angle sensor, gyroscope, accelerometer, and digital map database, as examples can also be deployed in this type of system. Each of these sensor types can be applied to recognize other systematic as well as gross, and random behavior types and further to modify this behavior to the end of improving the accuracy of a sensory system for vehicle navigation.

Considering the tire circumference problem we disclose a system for improvement in accuracy of heading by comparing heading values determined by a differential odometer, further referred to herein as an odometer that indicates a heading, incremental in nature, and a flux-gate compass, indicating heading, absolute in nature. For the remaining discussion the terms flux-gate compass, and compass, herein are synonymous. This improvement includes recalibration of the odometer while not introducing a distance traversed error, by recognizing the difference in behavior of the signal representing the distance traversed available from the odometer, incremental in nature, and the distance traversed, absolute in nature, calculable from successive readings from a GPS receiver. For the remaining discussion the terms distance traversed and distance herein are synonymous.

Figure 5:
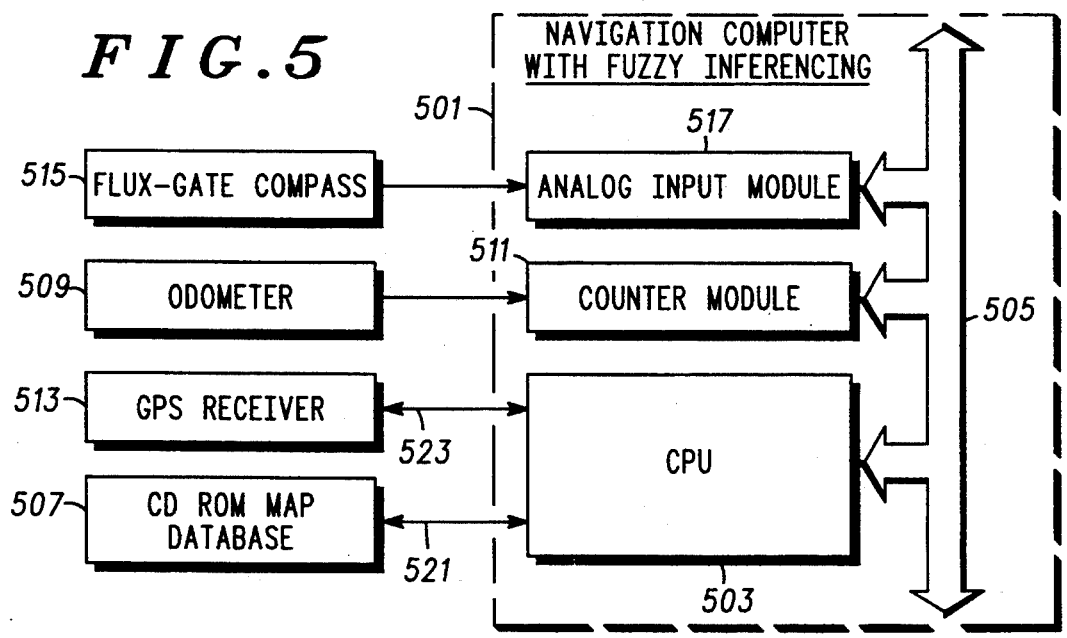
FIG. 5 illustrates a block diagram of a navigation computer with fuzzy inferencing providing a physical platform, as described in a preferred embodiment.

In the preferred embodiment, we describe a system for application in vehicle navigation where we apply a navigation computer with fuzzy inferencing capability. Referring to FIG. 5 we illustrate a physical platform for the navigation computer with fuzzy inferencing 501, by applying a MVME147SA-2 VME computer board, available from Motorola Inc., Microcomputer Division Marketing Department, MS DW283, 2900 South Diablo Way, Tempe, Ariz. 850282. This single board computer, or CPU 503 has a 32 Mhz 68030 with a 68882 floating point co-processor, 32 Mb of DRAM, and a battery backed real time clock calendar. A VME bus 505 is a conduit applied to couple various other functions to the CPU 503. Other microprocessor types and platforms are suitable for this task as well.

We couple the SCSI bus interface 521 from the CPU 503 to the CDROM 507, a CDU-541 available from Sony, Computer Peripheral Products Company, Sony Corporation of America 12337 Jones Road Suite 200-17 Houston, Tex. 77070. The CDROM 507 reads the digital map stored on an optical disk discussed later in the map matching discussion.

We then couple an odometer 509, in this case a digital position sensor, available from Honeywell's MICRO SWITCH division in Freeport, Illinois. One of these sensors is mounted on each of 2 non-powered wheels and coupled to a XVME-203 Counter Module 511 available from XYCOM Inc. 750 North Maple Road, Saline, Mich. 48176, connected to the CPU 503 by the VME bus 505. This Counter Module 511 captures the odometer pulses. The odometer 509 outputs pulses as the tires rotate, indicating distance traversed by the respective wheels.

A GPS receiver 513, the EAGLE VIII, available from Motorola Inc. Government Electronics Group, Scottsdale, Ariz. 85252, is coupled to the CPU 503 through an RS-232C port 523. The GPS receiver 513 provides vehicle position information.

A flux-gate compass 515, providing heading information, is coupled to a XVME-500 Analog Input Module 517 available from XYCOM Inc. 750 North Maple Road, Saline, Mich. 48176, that is connected to the CPU 503 by the VME bus 505. The flux-gate compass 515, is available from Etak Inc., 1430 O'Brien Drive, Menlo Park, Calif. 94025.

The CPU 503 runs the compiled inferencing software developed on an IBM PC host computer using software available from Togai Infralogic, Inc. 30 Corporate Park, Suite 107 Irvine, Calif. 92714. This software is titled the Fuzzy C development system. Once the fuzzy sets, defined by membership functions, and fuzzy rules are derived using the IBM PC host, the output of the Fuzzy C development system is a standard ANSI C source code. This source code is then compiled by using the M68NNTBGHC SYSTEM V/68 GREEN HILLS C-68000 Compiler, available from Motorola Inc., Microcomputer Division Marketing Department, MS DW283, 2900 South Diablo Way, Tempe, Ariz. 850282. The output of the compiler is then loaded onto the CPU 503 for application execution. Of course, other embedded software emulations can be used. Alternative fuzzy inferencing system platforms include fuzzy microcontroller circuits, fuzzy coprocessors, analog computational circuits, digital computer circuits, optical computers, spatial light modulators and holograms to name a few.

Figure 6:
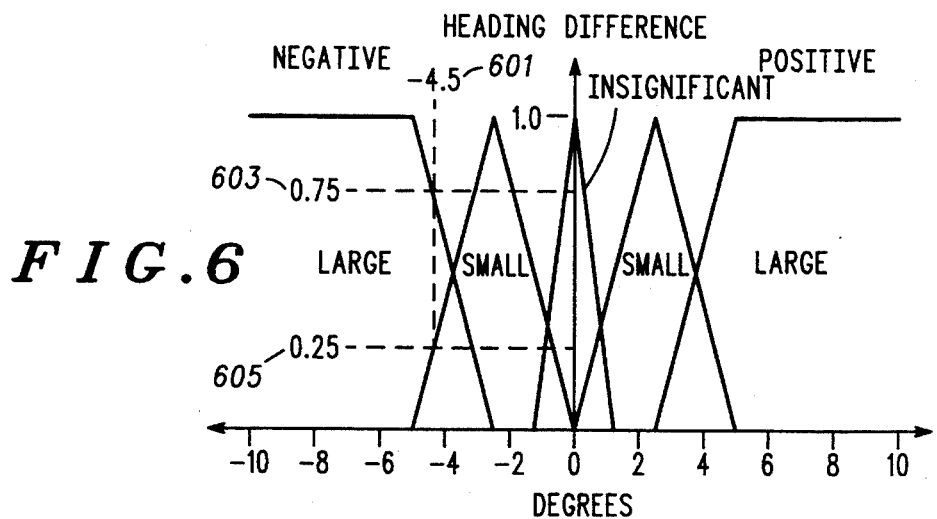
FIG. 6 illustrates the fuzzy set described in a preferred embodiment for quantifying the degree of heading difference, in this case quantified as the difference between the differential odometer behavior and the compass behavior.

We next consider the fuzzy sets for recognition and recalibration of the circular behavior in the odometer. FIG. 6 illustrates a fuzzy set, designed by observation and empirical knowledge, for classifying the degree that a heading difference, in this case the difference between the odometer and the compass, is a member of the Positive Large, Positive Small, Insignificant, Negative Small, and/or Negative Large sets. As illustrated in FIG. 6, a −4.5 degree heading difference 601 yields a truth value in the Positive and Insignificant sets of zero. The truth value in the Negative Small set is 0.25 603, and the truth value in the Negative Large set is 0.75, 605.

Figure 7:
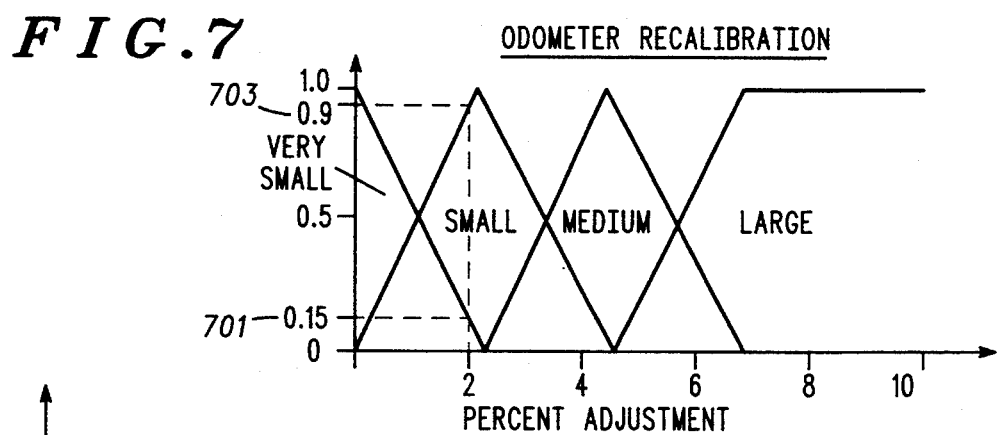
FIG. 7 illustrates the fuzzy set described in a preferred embodiment for quantifying the differential odometer recalibration variable.

FIG. 7 illustrates a fuzzy set for classifying the degree that a required odometer distance, and consequentially the heading, adjustment, or recalibration factor can be viewed as Very Small, Small, Medium, and Large. As illustrated in FIG. 7, a 2% tire circumference increase has a truth value of 0.15 701 in the Very Small set, a truth value of 0.9 703 in the Small set and a truth value of zero in the Medium and Large sets. The fuzzy set illustrated in FIG. 7 can be complementary applied to an odometer distance adjustment as later illustrated in the fuzzy rules in TABLE 1.

Figure 8:
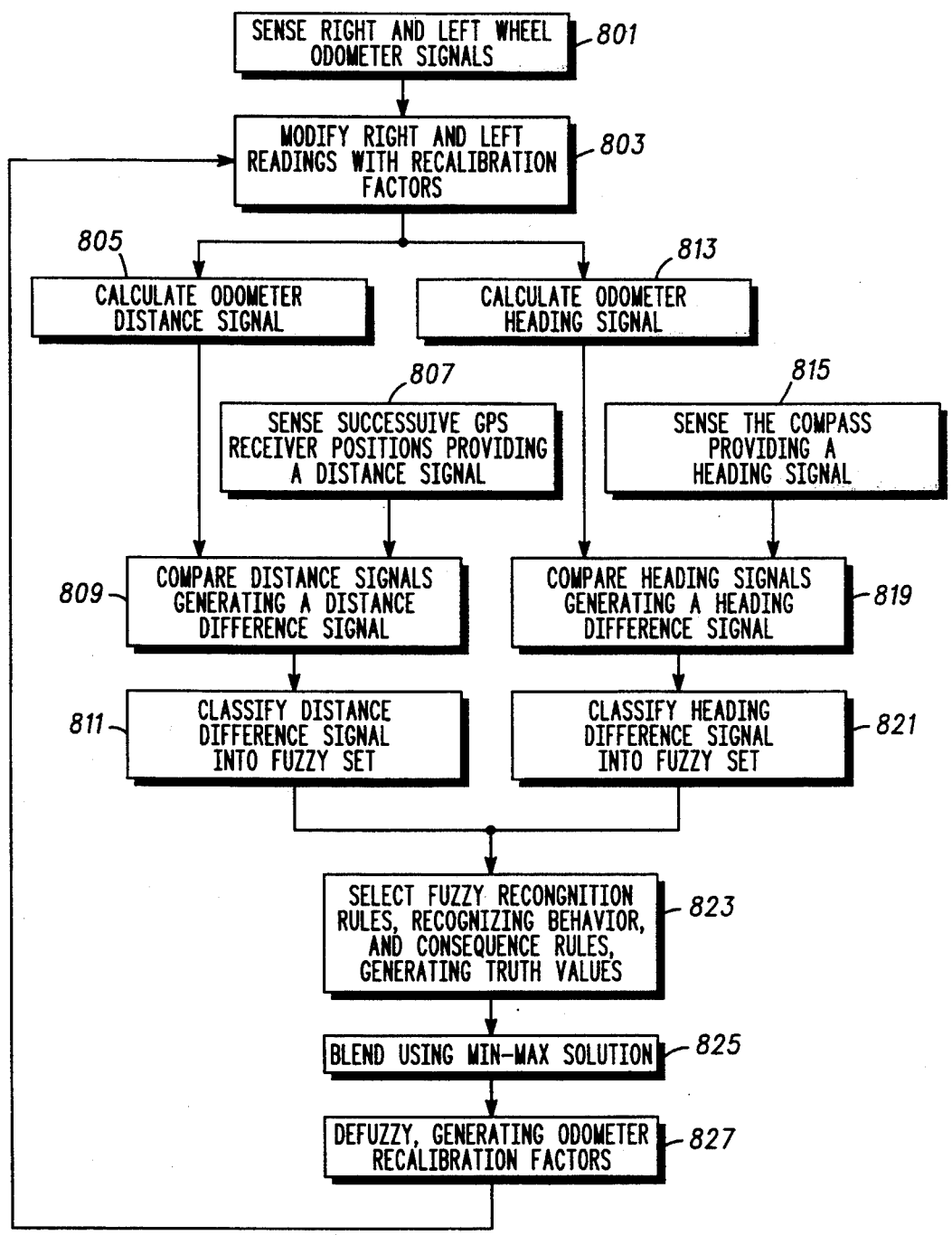
FIG. 8 illustrates a fuzzy inferencing method for recognition and recalibration of systematically erroneous differential odometer behavior described in a preferred embodiment, in flow chart form.

FIG. 8 illustrates a method flow chart describing the case of the odometer, applying fuzzy inferencing to recognize the erroneous behavior and recalibrate the odometer. We begin by sensing, or reading the right and left wheel odometer signals 801, providing distance signals. In step 803 we modify the right and left wheel readings with recalibration factors, if available. We then calculate the odometer distance signal 805 by averaging the right and left wheel odometer readings. We further develop an alternative distance signal by sensing 807 successive GPS receiver positions, having a behavior at least in part different from the odometer distance signal 805. We then compare 809 the distance signals, generating a distance difference signal. This signal is then subjected to its first step in the fuzzy inferencing process 811 that classifies the value of the distance difference signal into a fuzzy set. Concurrently we also calculate the odometer heading signal 813 by considering the difference between the left and right wheel signals. We further develop an alternative heading signal by sensing the compass providing a heading indication 815. We then compare 819 the heading signals, generating a heading difference signal. This signal is then subjected to its first step in the fuzzy inferencing process 821 that classifies the value of the heading difference signal into a fuzzy set, as illustrated earlier in FIG. 6. The fuzzy inferencing process then selects one or more recognition rules 823 intersecting with the distance and heading differences generating at least one truth value for consideration. We then blend 825 the various recalibration truth values using a Min-Max solution. And finally generate the odometer recalibration factors, by defuzzifying the selected truth value.

Figure 9:
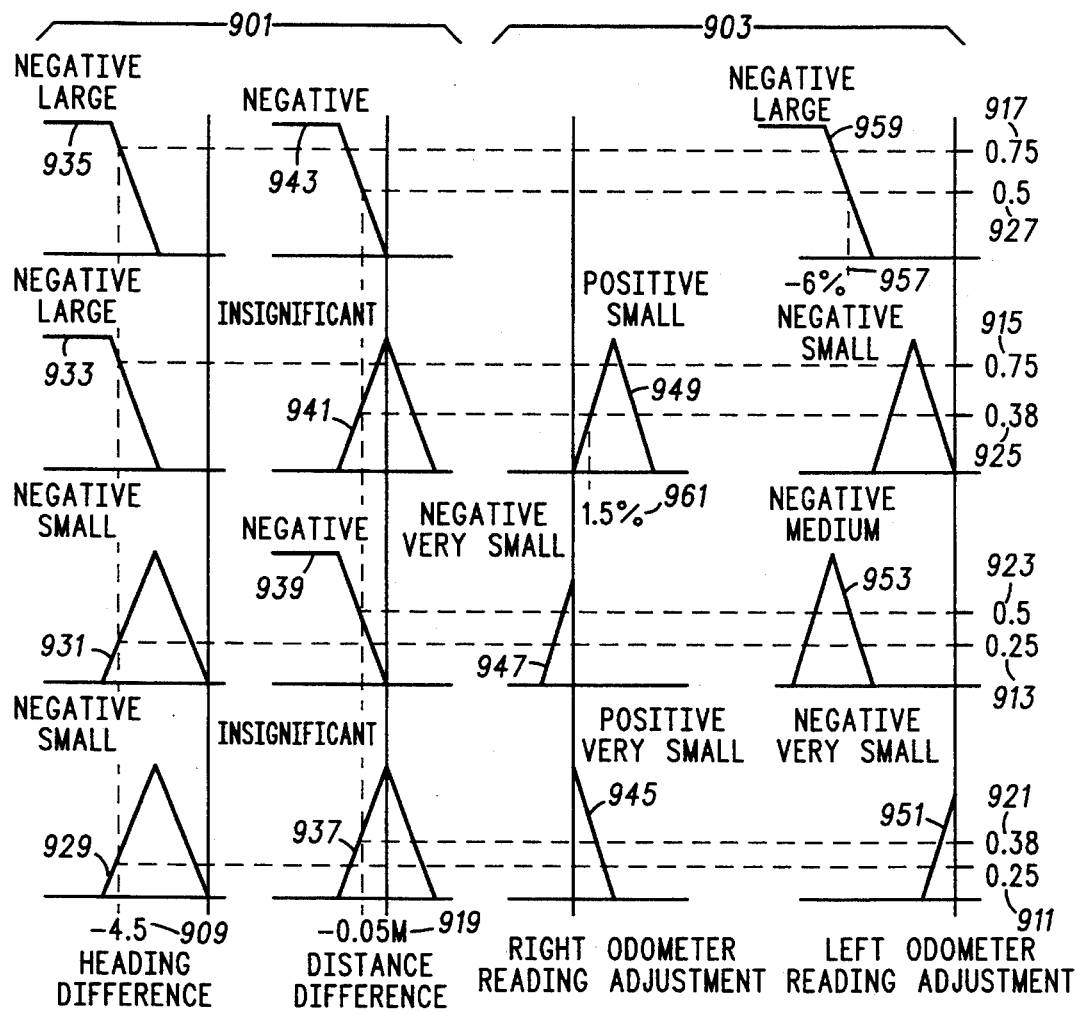
FIG. 9 is a graphical aid to better understand the inferencing process by showing an example of fuzzing inferencing with fuzzy sets and fuzzy rules applied in a preferred embodiment.

We now turn our attention to FIG. 9 which graphically illustrates a specific example of the odometer, compass, and GPS receiver sensor data and the associated fuzzy sets and fuzzy rules selected for this case. The two columns noted by 901 illustrate the specific fuzzy sets successfully selected during the classification and recognition steps of the fuzzy inferencing process. 929 and 931, Negative Small, 933 and 935, Negative Large represent the membership functions for classifying the degree of heading difference, and 937 and 941, Insignificant and 939 and 943, Negative representing the membership functions for classifying the degree of distance difference. The two columns denoted by 903 graphically illustrate the fuzzy sets selected during the fuzzy consequence process. The combination of the heading difference 909 of −4.5 degrees and the distance difference 919 of −0.05 meters selects four fuzzy recognition rules by being coincident with the fuzzy sets. With the aid of TABLE 1, which shows a descriptive form of the fuzzy rule set, we can further understand which fuzzy recognition rules are selectable and consequently, which fuzzy rules apply for selecting an adjustment or recalibration. Note that the items Capitalized are membership functions representing fuzzy sets and the items in UPPERCASE are formal linguistic operators for describing rules.

TABLE 1

A. IF the heading difference IS Negative Large
   AND IF the distance difference IS Negative
   THEN MAKE the left wheel distance adjustment Negative Large
B. IF the heading difference IS Negative Large
   AND IF the distance difference IS Insignificant
   THEN MAKE the left wheel distance adjustment Negative Small AND MAKE the right wheel distance adjustment Positive Small
C  IF the heading difference IS Negative Large
   AND IF the distance difference IS Positive
   THEN MAKE the right wheel distance adjustment Positive Large
D. IF the heading difference IS Negative Small
   AND IF the distance difference IS Negative
   THEN MAKE the left wheel distance adjustment Negative Medium AND MAKE the right wheel distance adjustment Negative Very Small
E. IF the heading difference IS Negative Small
   AND IF the distance difference IS Insignificant
   THEN MAKE the left wheel distance adjustment Negative Very Small AND MAKE the right wheel distance adjustment Positive Very Small
F. IF the heading difference IS Negative Small
   AND IF the distance difference IS Positive
   THEN MAKE the left wheel distance adjustment Positive Very Small AND MAKE the right wheel distance adjustment Positive Medium

TABLE 1-continued

G. IF the heading difference IS Insignificant
AND IF the distance difference IS Negative
THEN MAKE the left wheel distance adjustment Negative Small AND MAKE the right wheel distance adjustment Negative Small H. IF the heading difference IS Insignificant
AND IF the distance difference IS Positive
THEN MAKE the left wheel distance adjustment Positive Small AND MAKE the right wheel distance adjustment Positive Small I. IF the heading difference IS Positive Small
AND IF the distance difference IS Negative
THEN MAKE the left wheel distance adjustment Negative Very Small AND MAKE the right wheel distance adjustment Negative Medium J. IF the heading difference IS Positive Small
AND IF the distance difference IS Insignificant
THEN MAKE the left wheel distance adjustment Positive Very Small AND MAKE the right wheel distance adjustment Negative Very Small K. IF the heading difference IS Positive Small
AND IF the distance difference IS Positive
THEN MAKE the left wheel distance adjustment Positive Medium AND MAKE the right wheel distance adjustment Positive Very Small L. IF the heading difference IS Positive Large
AND IF the distance difference IS Negative
THEN MAKE the right wheel distance adjustment Negative Large M. IF the heading difference IS Positive Large
AND IF the distance difference IS Insignificant
THEN MAKE the left wheel distance adjustment Positive Small AND MAKE the right wheel distance adjustment Negative Small N. IF the heading difference IS Positive Large
AND IF the distance difference IS Positive
THEN MAKE the left wheel distance adjustment Positive Large In the case illustrated in FIG. 9 fuzzy rule E, from TABLE 1, is selected as the heading difference of −4.5 degrees 909 intersects with the Negative Small set 929 with a truth value of 0.25 911, and the distance difference of −0.05 meters 919 intersects with the Insignificant set 937 yielding a truth value of 0.38, 921. Fuzzy rule D is selected as a heading difference of −4.5 degrees 909, intersects with a Negative Small set 931 having a truth value of 0.25 913, and a distance difference of −0.05 meters 919, intersects with the Negative set 939 yielding a truth value of 0.5, 923. Fuzzy rule B is selected as heading difference of −4.5 degrees 909, intersects with a Negative Large set 933 yielding a truth value of 0.75 915, and the distance difference of −0.05 meters 919, intersects with the Insignificant set 941 yielding a truth value of 0.38, 925. Fuzzy rule A is selected as the heading difference of −4.5 degrees 909, intersects with the Negative Large set 935 yielding a truth value of 0.75 917, and the distance difference of −0.05 meters 919, intersects with the Negative set 943 yielding a truth value of 0.5, 927.

The fuzzy rule consequences, or recalibration factors, are then selected, graphically illustrated by the columns represented in 903. Before the actual recalibration factor is synthesized, the combination of fuzzy rule selections must be considered and blended. The example we will illustrate is a simple method for a selective matching of fuzzy rules and selecting the consequences. The method is called Min-Max matching, as the selection of the matched values is based on their minimum then maximum weights. Of course, it would be obvious to one of ordinary skill in the art that other methods, for instance continuous weighted blending, also known as the centroid method, are applicable for this matching and blending process.

The heading difference of −4.5 degrees 909 intersects with the Negative Small set 929 yielding a truth value of 0.25, 911. This truth value 0.25 911 also intersects with the Positive Very Small set, 945 of right odometer reading adjustments. Each of the other selected fuzzy recognition rules A, B, and D, embody like consequential fuzzy sets. In the first step of blending we search for the minimum truth value, by executing a fuzzy AND function.

For fuzzy rule E, the intersection of the sensor readings of −4.5 degrees 909 and −0.05 meters 919 with the recognition elements graphically represented by 929 and 937 lead to two intersecting truth values in the consequence fuzzy sets 945 and 951 in truth values of 0.25 911 and 0.38, 921. As the truth value 0.25 911 is the minimum of this fuzzy set it becomes our first accepted truth value in our fuzzy AND analysis. Repeating this analysis we find that 0.25 913, the 0.38 925 and the 0.5 927 truth values represent the other elements of the minimum fuzzy set.

The next step is to combine, or blend the results using a fuzzy OR function. We do this by looking for the maximum truth value of the selected ANDed. truth values 0.25 911, 0.25 913, 0.38 925, and 0.5, 927. The result is 0.5 927 which represents the minimum truth value from the selected fuzzy rule A while being the maximum truth value of all the selected fuzzy rules after combination.

The final step is to defuzzify the truth value thus, assigning a conclusion, in this case a recalibration factor. We do this by looking at the intersection of the truth value chosen 0.5 927 and the left wheel adjustment set Negative Large 959 and find the answer which is −6%, 957. This recalibration factor is used to modify and to recalibrate the left odometer sensor. As there is no recalibration in this case for the right odometer sensor we again look for the maximum truth value and find 0.38 925 and the resulting recalibration factor of 1.5%, 961. This process has taken into account the recognition and recalibration of error corresponding to the circular behavior observed in heading and to the distance error caused by the same tire circumference difference. Of course, it would be obvious to one of ordinary skill in the art to gate this process by the recognition of stable data before invocation of this process. If, for instance, there were recent gross errors or maneuvers indicated by the sensors the recalibration should not be undertaken. Or for correcting odometer distance by GPS receiver position is only feasible when the GPS receiver error range is negligible compared to the accumulated odometer distance errors.

Based on another set of fuzzy sets and fuzzy rules we can identify the relative accuracy of an independent sensor and assign it a clearness coefficient before finally fusing it with other similar sensor navigation parameters, representing the same navigation variable, in this case heading. This analysis relies on the causal relationship between past and future stating that:

TABLE 2

A. IF the Most Recent readings from a particular sensor are In Error
THEN likely that sensor has an erroneous behavior therefore discount sensor importance by Reducing the clearness coefficient.

Figure 2:
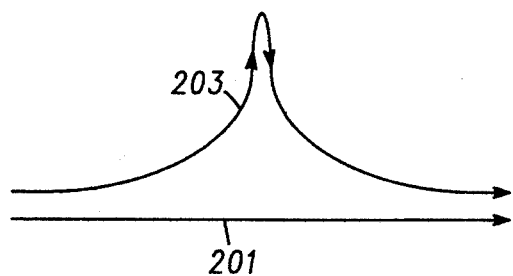
FIG. 2 is a diagram of heading information output over time from a compass and a wheel slippage error, gross in nature, in heading information output from a differential odometer.
Figure 10:
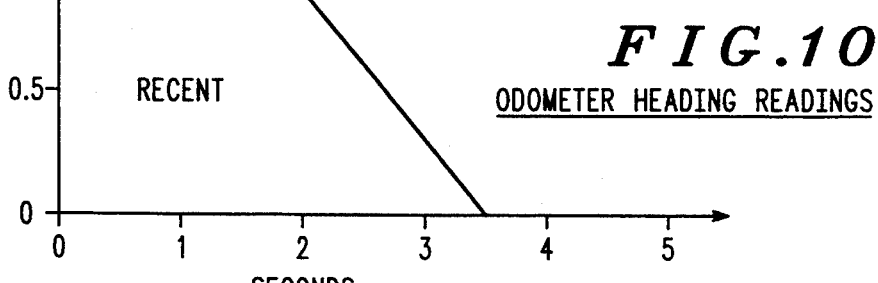
FIG. 10 is a fuzzy set described in a preferred embodiment for quantifying the odometer heading readings as Recent.
Figure 11:
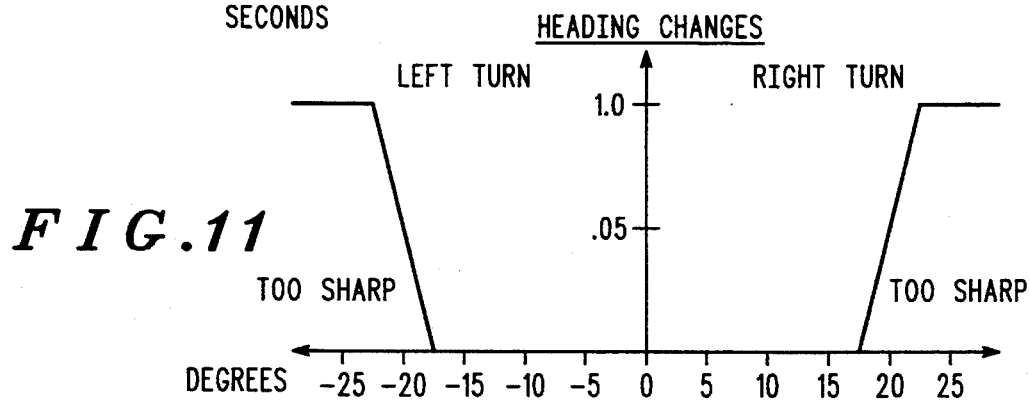
FIG. 11 is a fuzzy set described in a preferred embodiment for quantifying the degree which an odometer heading change is Too Sharp a right or left turn.
Figure 12:
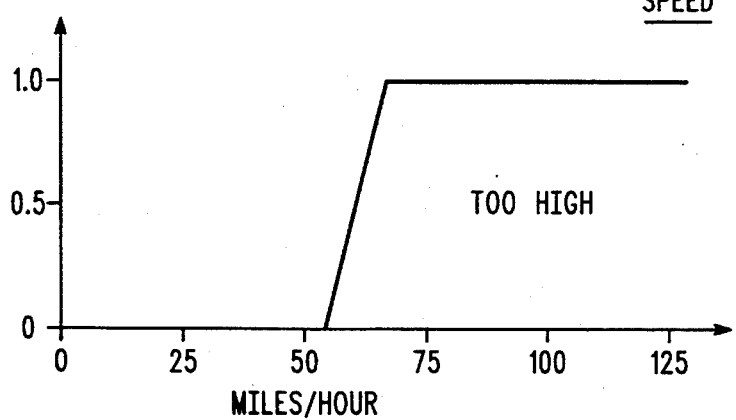
FIG. 12 is a fuzzy set described in a preferred embodiment for quantifying the degree which an odometer heading change is Too High speed.
Figure 13:
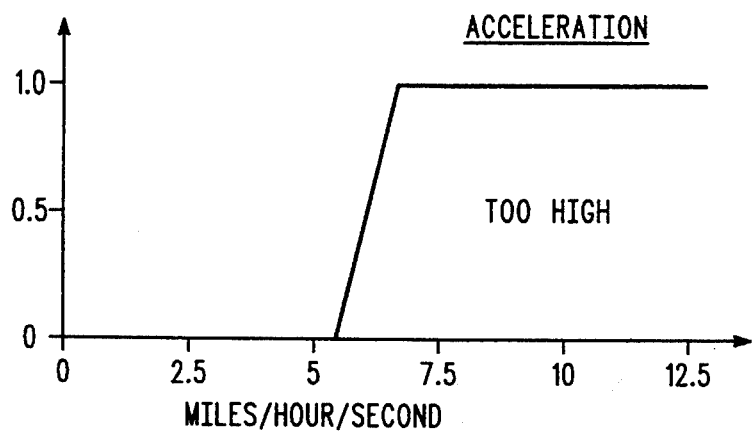
FIG. 13 is a fuzzy set described in a preferred embodiment for quantifying the degree which an odometer heading change is Too High acceleration.
Figure 14:
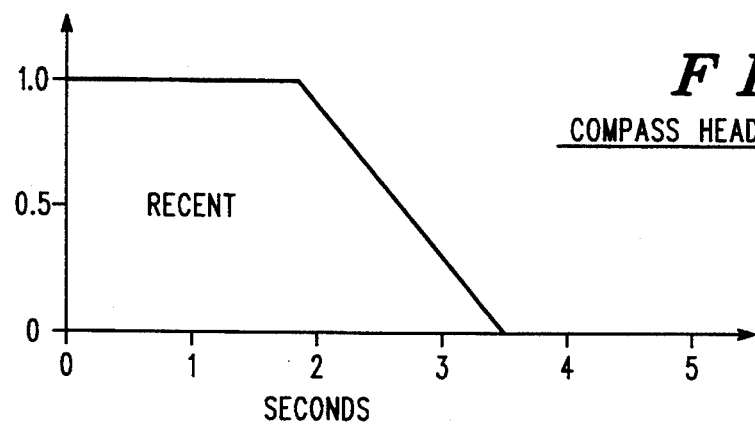
FIG. 14 is a fuzzy set described in a preferred embodiment for quantifying the compass heading readings as Recent.
Figure 15:
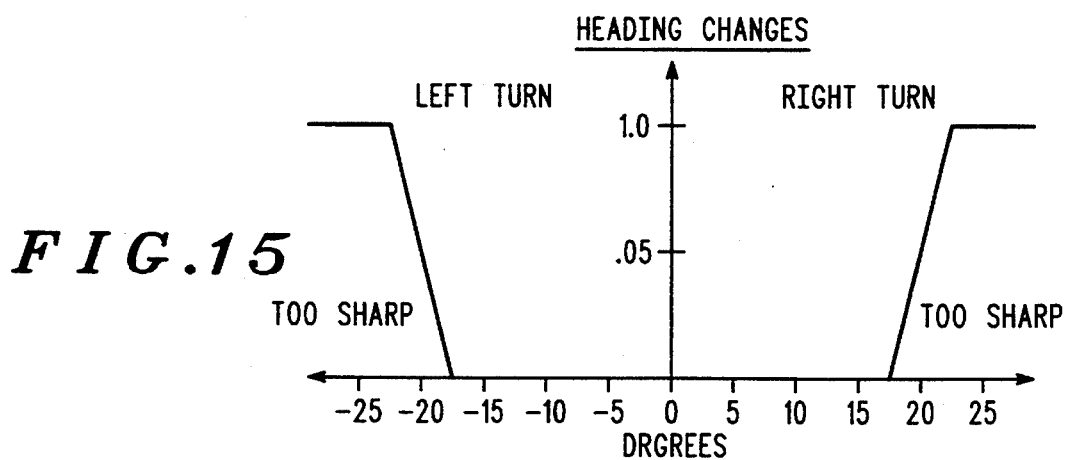
FIG. 15 is a fuzzy set described in a preferred embodiment for quantifying the degree which a compass heading change is Too Sharp a right or left turn, indicating a magnetic blunder.

Referring to FIG. 2 we find a compass heading 201 and odometer heading 203 while a wheel is slipping. For the case of the odometer clearness we illustrate in FIG.'s 10, 11, 12, and 13 fuzzy sets describing the antecedent conditions leading to wheel slippage, a behavior gross in nature. The consequential truth value for clearness coefficient will be a function of this set. As wheel slippage is detected the clearness coefficient will be reduced. We apply the fuzzy sets illustrated in FIG. 10, classifying to what extent the odometer heading changes are Recent, FIG. 11, classifying the extent to which the odometer heading changes infer Too Sharp right or left turns, FIG. 12, classifying to what extent the odometer readings are Too High speed, and FIG. 13, classifying to what extent the odometer readings are Too High acceleration. The fuzzy error recognition and clearness coefficient consequence rules are as follows:

TABLE 3

A. IF Some of the Recent odometer heading changes are Too Sharp Left turn
    THEN the right wheel IS slipping AND right odometer clearness IS Low
B. IF Some of the Recent odometer heading changes are Too Sharp Right turn
    THEN the left wheel IS slipping AND left odometer clearness IS Low
C. IF Some of the Recent right odometer readings are Too High speed
    THEN the right wheel IS slipping AND right odometer clearness IS Low
D. IF Some of the Recent left odometer readings are Too High speed
    THEN the left wheel IS slipping AND left odometer clearness IS Low
E. IF Some of the Recent right odometer reading changes are Too High acceleration
    THEN the right wheel IS slipping AND right odometer clearness IS Low
F. IF Some of the Recent left odometer reading changes are Too High acceleration
    THEN the left wheel IS slipping AND left odometer clearness IS Low As illustrated in FIGS. 8 and 9 the blending of the TABLE 3 truth values will yield a clearness coefficient for the odometer sensor.

Figure 3:
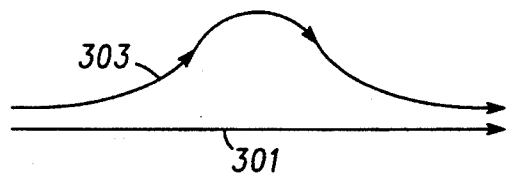
FIG. 3 is a diagram of heading information output over time from a differential odometer and a magnetic blunder error, gross in nature, in heading information output from a compass.

Further, considering the case of the compass we illustrate in FIG. 3 a compass heading 301 and odometer heading 303 while the compass responds to a magnetic blunder. For the case of the compass clearness we illustrate in FIG's 14 and 15 fuzzy sets describing the antecedent conditions leading to a magnetic blunder, a behavior gross in nature. The consequential truth value for clearness coefficient will be a function of this set. As a magnetic blunder is detected the clearness coefficient will be reduced. The fuzzy error recognition and clearness coefficient consequence rules are as follows:

TABLE 4

A. IF Some Recent compass heading changes imply a Too Sharp Left turn
    THEN compass IS exhibiting a magnetic blunder AND compass clearness IS Low
B. IF Some Recent compass heading changes imply a Too Sharp Right turn
    THEN compass IS exhibiting a magnetic blunder AND compass clearness IS Low As illustrated in FIG's 8 and 9 a similar blending of the TABLE 4 truth values will yield a clearness coefficient.

We then fuse the navigation parameters from the various sensors, by selecting the sensor with the highest clearness coefficient for the navigation parameter measured yielding the respective navigation variable. The result in this example is the fused heading variable. Of course, it would be obvious to one with ordinary skill in the art to alternatively apply other methods of fusion such as the weighted sum of averages or fuzzy clustering.

Figure 4:
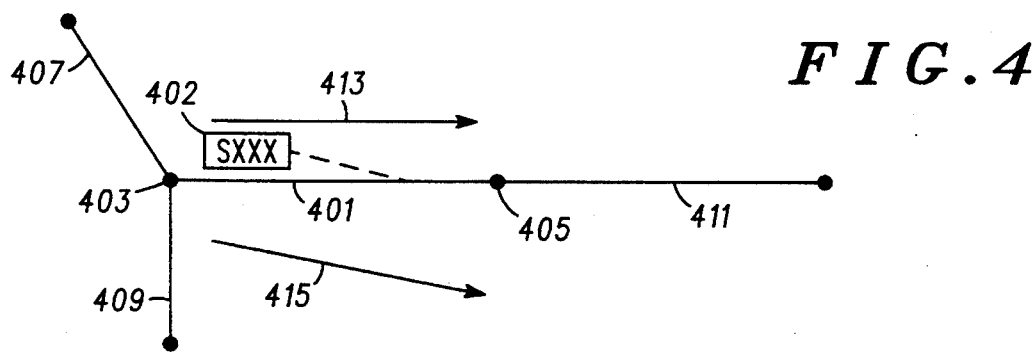
FIG. 4 is a diagram of a digital map, showing a heading and an axis offset heading error.

FIG. 4 illustrates a map with road segments denoted by 401, 407, 409, and 411. When queried with a position, the map database yields a segment ID 402, bounded by two nodes 403 and 405 and the heading for the segment 413. In this case, the segment selected is illustrated by 401. Based on the position, derived from various sensors in the same manner as the fused heading variable, of the vehicle we try to determine if the vehicle is on this 401 road segment.

If our confidence is high that the vehicle is on-road, segment denoted by 401, for a long enough time, we can substitute our fused heading variable with the heading of the road segment 413, yielding an even higher accuracy heading variable.

We need to consider several things to accurately infer the on-road truth value. The rule we will apply is as follows:

TABLE 5

A. IF the vehicle IS NOT Maneuvering
    AND IF the distance error IS Insignificant
    AND IF the heading error IS Insignificant
    THEN the vehide IS On-Road To determine whether we are maneuvering we illustrate in FIG. 16 a fuzzy set describing the antecedent conditions leading to recognition of maneuvers. The consequential truth value for maneuvers will be a function of this set. When blended, if the truth value is greater than zero it indicates that a maneuver is in progress to a certain degree.

The fuzzy maneuver recognition rule is as follows:

TABLE 6

A. IF Most Recent odometer heading changes are Medium Clockwise
    AND IF Most Recent compass heading changes are Medium Clockwise
    AND IF odometer clearness IS High
    AND IF compass clearness IS High
    THEN the vehicle IS Maneuvering
B. IF Most Recent odometer heading changes are Medium Counter-Clockwise
    AND IF Most Recent compass heading changes are Medium Counter-Clockwise
    AND IF odometer clearness IS High
    AND IF compass clearness IS High
    THEN the vehicle IS Maneuvering FIG. 16 shows membership functions describing a spectrum of maneuvers. For instance, one could consider the lane change, swerve, and turn as specific cases of the Medium membership function illustrated by 1601 and 1603. Of course, as denoted by the fuzzy set in FIG. 16 we can compose rules that further recognize the type of maneuver. This is particularly useful for determining vehicle location when the vehicle is on the map. One case is when the vehicle undergoes a lane change when on an expressway, near an exit. From this maneuver we can infer that the vehicle is approaching the exit ramp.

For the next step we need, as discussed earlier, to have a position variable derived from various sensors, such as the odometer, compass and GPS receiver, and fused by the process described for the heading variable.

Next, we test to see if the distance error is significant by subtracting the fused position from the position indicated by the selected map segment 401 and classifying the result into the fuzzy set illustrated in FIG. 17 representing the truth value for which the distance difference participates insignificantly in the set. We then subtract the fused heading variable from the heading indicated by the selected map segment 413, classifying the result into the fuzzy set illustrated in FIG. 18 representing the truth value for which the heading difference participates insignificantly in the set. Returning to Rule A in TABLE 5 we can infer the truth value for on-road.

As described earlier we then need to ensure that the vehicle is on-road long enough such that our confidence is high enough to substitute the fused heading variable with the road segment heading variable.

We do this by integrating the most recent on-road truth values and we test for the magnitude of the resulting truth value. If the truth value is too low then we do not have enough confidence that we've been on the road segment long enough to replace the fused heading variable with the road segment heading value. After some time, if the road segment is long enough, the truth value builds to a high enough value such that our confidence is high enough to replace the heading variable with the heading of the road segment. We now present the rule to determine the need to correct the heading based on the persistence and the confidence of the on-road condition.

TABLE 7

A. IF for Most Recent distance the vehicle IS On-Road THEN Correct Heading

The integration is performed by calculating the weighted sum of all on-road truth values recently inferred by rule A in TABLE 5, as specified in the following formulas:

$$\Sigma w(i) * on\text{-}road(i) = correct\ heading$$

The maximum weight value is determined by the following formula:

$$(W_{max} * N_{max}) + \left(\frac{(W_{max} * N_{falling})}{2}\right) = 1$$

where:
$N_{max}$ is the number of measurements while maximum Recent truth value applies and;
$N_{falling}$ is the number of measurements on the falling edge of the Recent distance membership function in FIG. 19

The benefit of this method is to yield a higher accuracy reading for heading. This technique could also be used to correct the position variable. Of course, one could further recognize conditions that are based on completing different types of maneuvers and on specific shapes and configurations of road segments for inferring the on-road truth value and for inferring position and/or heading corrections.

Another way of improving this approach is applying different antecedent membership functions depending on the accumulated distance traversed membership functions that determine the accumulated error.

Of course, with the appropriate fuzzy sets and fuzzy rules one can recognize and correct for other types of erroneous behavior, such as random, gross, and/or systematic, as well as recalibrate the sensory system, or assign a clearness coefficient to a sensor where applicable. These behaviors include the cases described in the background as well as many others.

In conclusion, we have presented a system for improving the accuracy of the sensory information necessary for an on-vehicle navigation system by application of a model free analysis, in this case a fuzzy inferencing system. We disclosed specific examples for recognizing systematic and gross errors. Of course, it would be obvious to one of ordinary skill in the art to apply this technique to recognize and modify other erroneous behavior including those random in nature. This system recognizes erroneous behavior, and where applicable recalibrates the sensor system, assigns a clearness coefficient and fuses multiple sensor signals and adjust the result by matching a map, yielding improved accuracy navigation variables necessary to improving the accuracy of an on-vehicle navigation system.

What is claimed is:

1. An improved accuracy sensory system for vehicle navigation comprising:
   first means for sensing a navigation parameter of a vehicle and for providing a first signal indicative of said navigation parameter;
   second means for sensing said navigation parameter of the vehicle and for providing a second signal indicative of said navigation parameter;
   means for classifying a difference between said first signal and said second signal into a plurality of sets representative of predetermined behaviors; and
   means for providing a clearness coefficient for the first signal dependent on a degree of participation of the difference between the first and second signals in each of the plurality of sets.

2. A system in accordance with claim 1 wherein the means for providing a clearness coefficient provides a decreasing clearness coefficient if the difference between the first and second signals increases.

3. A method of an improved accuracy sensory system for vehicle navigation comprising the steps of:
   sensing a navigation parameter of a vehicle and for providing a first signal indicative of said navigation parameter;
   sensing said navigation parameter of the vehicle and for providing a second signal indicative of said navigation parameter;
   classifying a difference between the first signal and the second signal into a plurality of sets representative of predetermined behaviors; and
   providing a clearness coefficient for the first signal dependent on a degree of participation of the difference between the first and second navigation parameters in each of the plurality of sets.

4. An improved accuracy sensory method for vehicle navigation, the method comprising:
   sensing a heading of a vehicle and for providing a first heading in response thereto;
   sensing another heading of a vehicle and for providing a second heading in response thereto;
   classifying a difference between the first and second headings into a plurality of sets representative of predetermined behaviors;
   providing a clearness coefficient for the first heading dependent on a degree of participation of the difference between the first and second headings in each of the plurality of sets; and deriving a fused heading variable indicative of a heading of the vehicle by combining the first heading, dependent on the clearness coefficient, and the second heading.

5. An improved accuracy sensory system for vehicle navigation comprising:

a compass providing a compass heading signal;

an odometer providing an odometer heading signal and an odometer distance traversed signal, wherein both the odometer heading signal and the odometer distance traversed signal are determined dependent on a left wheel and a right wheel calibration factor;

a GPS receiver providing a GPS distance traversed signal;

means for classifying a difference in distance traversed between the odometer distance traversed signal and the GPS distance traversed signal into a plurality of distance traversed sets representative of predetermined behaviors, and for classifying a difference in heading between the compass heading signal and the odometer heading signal into a plurality of heading sets representative of predetermined behaviors; and means for providing a left wheel and a right wheel calibration factor to the odometer dependent on a degree of participation of the difference in distance traversed in each of the plurality of distance traversed sets and a degree of participation of the difference in heading in each of the plurality of heading sets.

* * * * *